Figure 1:
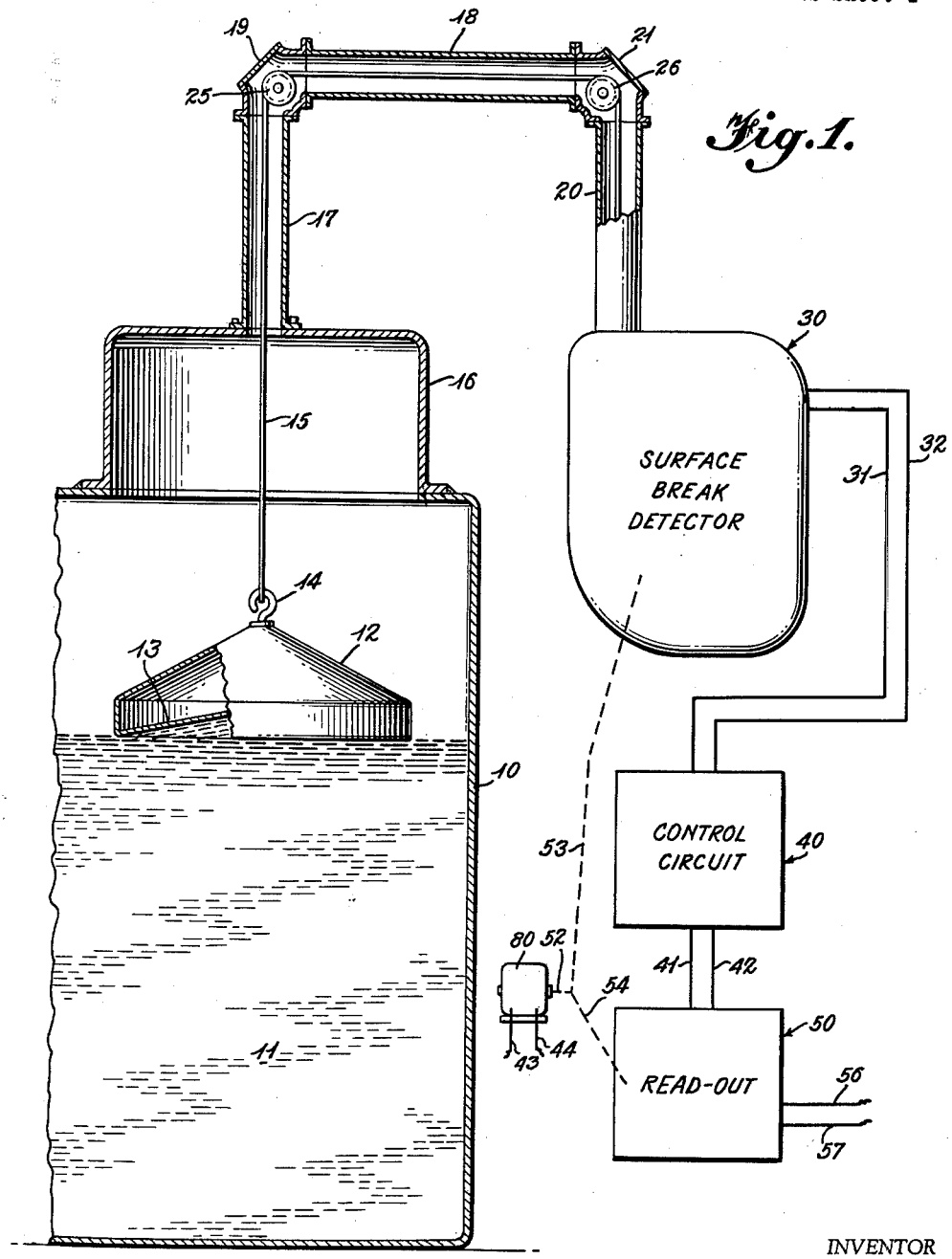

March 19, 1963 R. L. YARNALL 3,081,547
APPARATUS FOR DETECTING SURFACE BREAK
Filed June 23, 1958 5 Sheets-Sheet 1

INVENTOR
Richard L. Yarnall

BY Stevens, Davis, Miller & Mosher
ATTORNEYS

March 19, 1963 R. L. YARNALL 3,081,547
APPARATUS FOR DETECTING SURFACE BREAK
Filed June 23, 1958 5 Sheets-Sheet 3

INVENTOR
*Richard L. Yarnall*
BY *Stevens, Davis, Miller & Mosher*
ATTORNEYS

March 19, 1963 R. L. YARNALL 3,081,547
APPARATUS FOR DETECTING SURFACE BREAK
Filed June 23, 1958 5 Sheets-Sheet 4
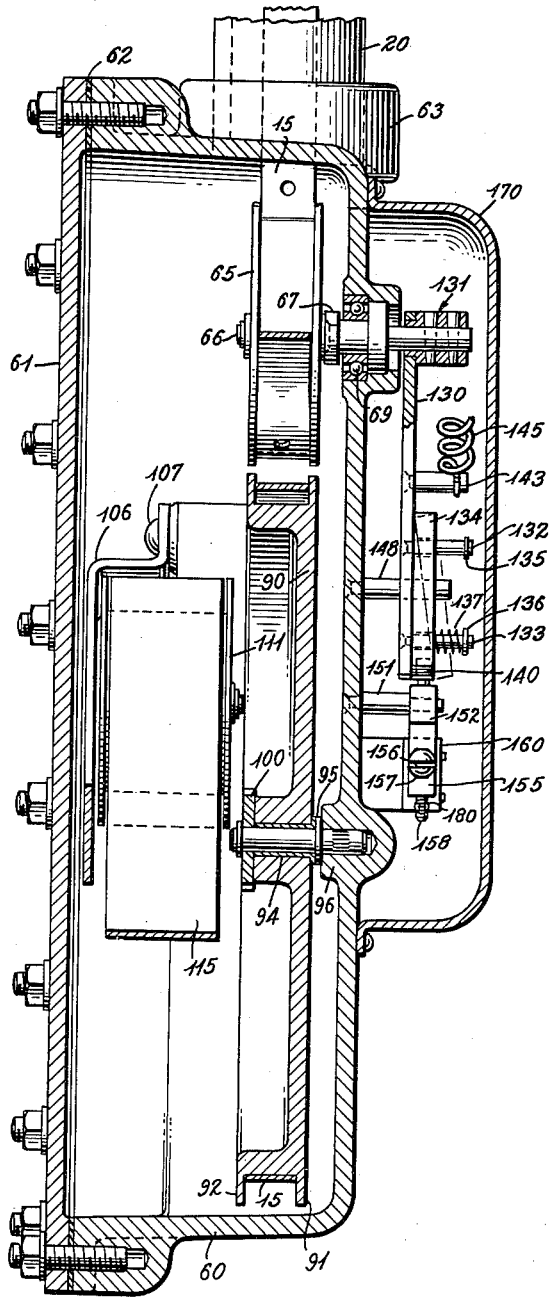
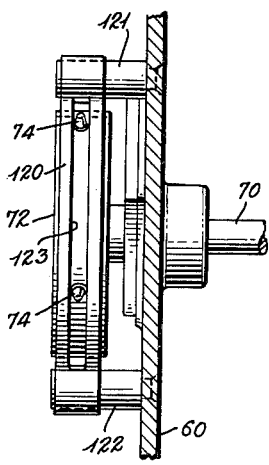
INVENTOR
*Richard L. Yarnall*
BY *Stevens, Davis, Miller & Mosher*
ATTORNEYS March 19, 1963 R. L. YARNALL 3,081,547
APPARATUS FOR DETECTING SURFACE BREAK
Filed June 23, 1958 5 Sheets-Sheet 5

INVENTOR
Richard L. Yarnall

BY Stevens, Davis, Miller & Mosher
ATTORNEYS

United States Patent Office 3,081,547
Patented Mar. 19, 1963

3,081,547
APPARATUS FOR DETECTING SURFACE BREAK
Richard L. Yarnall, Houston, Tex., assignor to Texas Instruments Incorporated, Dallas, Tex., a corporation of Delaware
Filed June 23, 1958, Ser. No. 743,606
13 Claims. (Cl. 33—126.5)

The present invention relates to apparatus useful in gauging the level of a contained liquid. More particularly, the apparatus of the present invention includes a liquid level float in combination with means to elevate the float from the surface of a contained liquid. The apparatus is designed and operated so that it functions to produce an electrical pulse during elevation of the float at the precise instant the float breaks with the surface of the liquid.

Prior to the present invention, there have been many systems devised for gauging liquid level. In many of these systems, floats of one type or another are employed and usually a tape or cable is attached to the float and passed over pulleys and terminated at a point outside of the tank or other type container being gauged. The end of the tape or cable is taken up on either a spring biased drum or reel or else weighted to keep slight tension on the tape or cable. Customarily the tape or cable is marked with indicia calibrated on any conventional standard whereby readings of liquid level can be made directly from the tape or cable by visual inspection.

In recent times, the art has turned toward the gauging of tanks or other liquid containers located at remote points responsive to an inquiry from a central station. In these circumstances, it is not practical for the values representative of liquid level to be presented directly as sensible indications. In such systems, it is desirable to translate or convert the values representative of liquid level into a desirable form of energy for transmission to the central station whereat it is converted or translated into a sensible indication of liquid level. The preferred form of energy for transmission is, of course, electrical, due to its ease of handling and its ability to be transmitted over long distances.

In adapting liquid level gauging systems to this telemetric concept efficient arrangements are being sought for obtaining extremely accurate values representative of liquid level and for converting them into electrical energy. One of the principal problems encountered in telemetric systems of this type is the inability of instantaneously gauging to obtain values which are closely and accurately correlated with liquid level. Until now, no satisfactory method has been available whereby electrical energy can be generated as an instantaneous and accurately correlated indication of liquid level.

By the present invention, a new form of apparatus is provided for gauging liquid level utilizing a float and tape arrangement and which operates on a surface tension principle. The float is elevated from the surface of the liquid responsive to an inquiry from a central station. During elevation, the float will have to overcome the force of surface tension. An electrical pulse is generated at the precise instant the float overcomes the surface tension and breaks with the surface of the liquid. This electrical pulse, since it occurs simultaneously with surface break, is an accurate indication of liquid level and can be used in a variety of ways for coding and transmitting liquid level values. For example, the pulse can be used for switching to connect a code reader correlated with the float and tape with a transmission system for reporting to a central station.

Accordingly, it is a principal object of the present invention to provide an apparatus to be used in the gauging of liquid level that operates using a surface tension principle and which functions to produce an electrical pulse indicative of liquid level. The pulse can be used for switching or in any other capacity to aid in the measuring, translation or transmission of values representative of liquid level.

It is a further object of the present invention to provide an apparatus of the type described which is characterized by a simplicity of design and possesses the requisite ruggedness of construction for use in the field and at remote installations.

It is a still further object of the present invention to provide an apparatus of the type described which is characterized by a high degree of accuracy which accuracy is not impaired by changes in the buoyancy of the float nor by changes in the specific gravity of the liquid in the tank.

Figure 2:
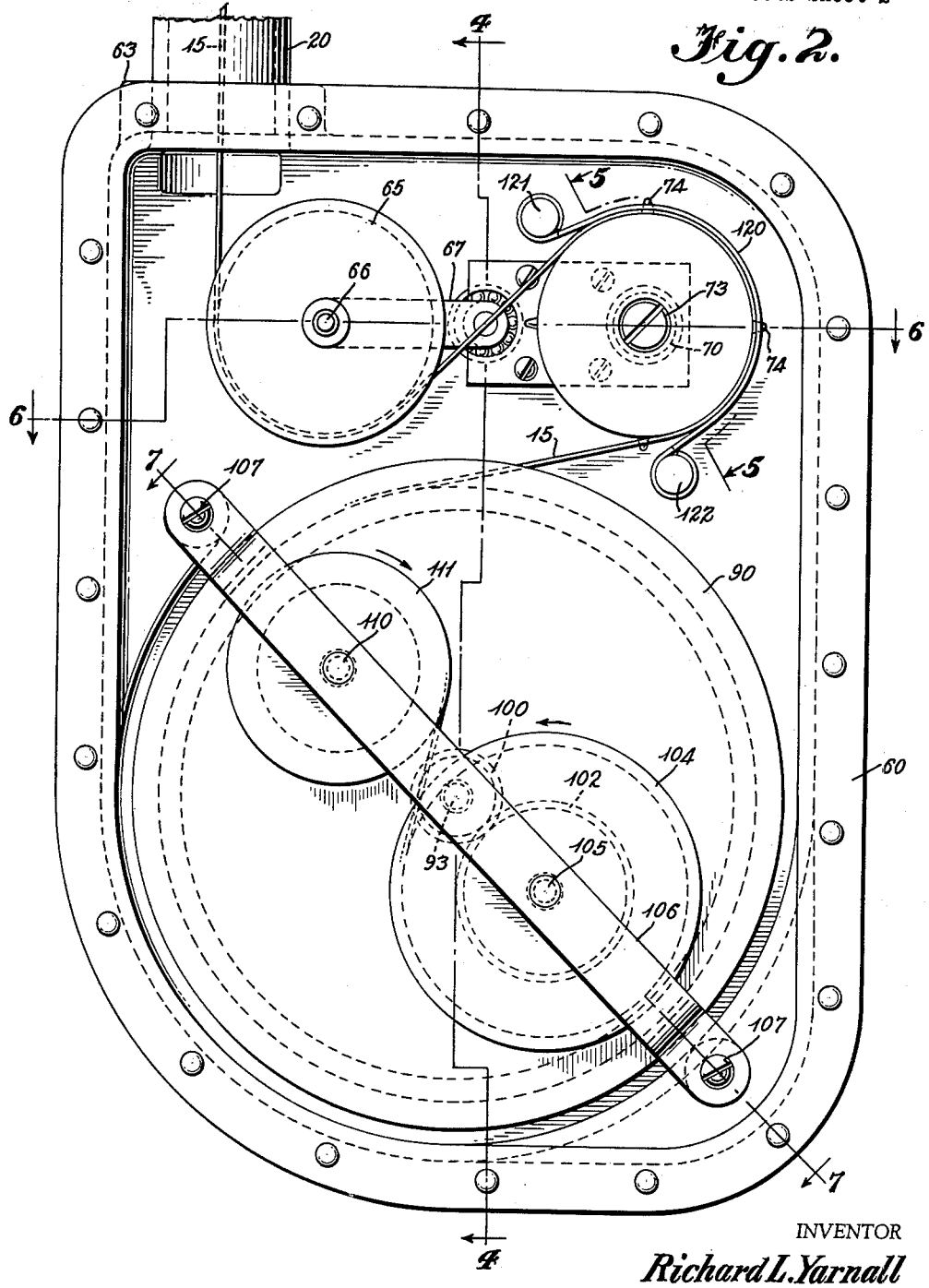
Figure 3:
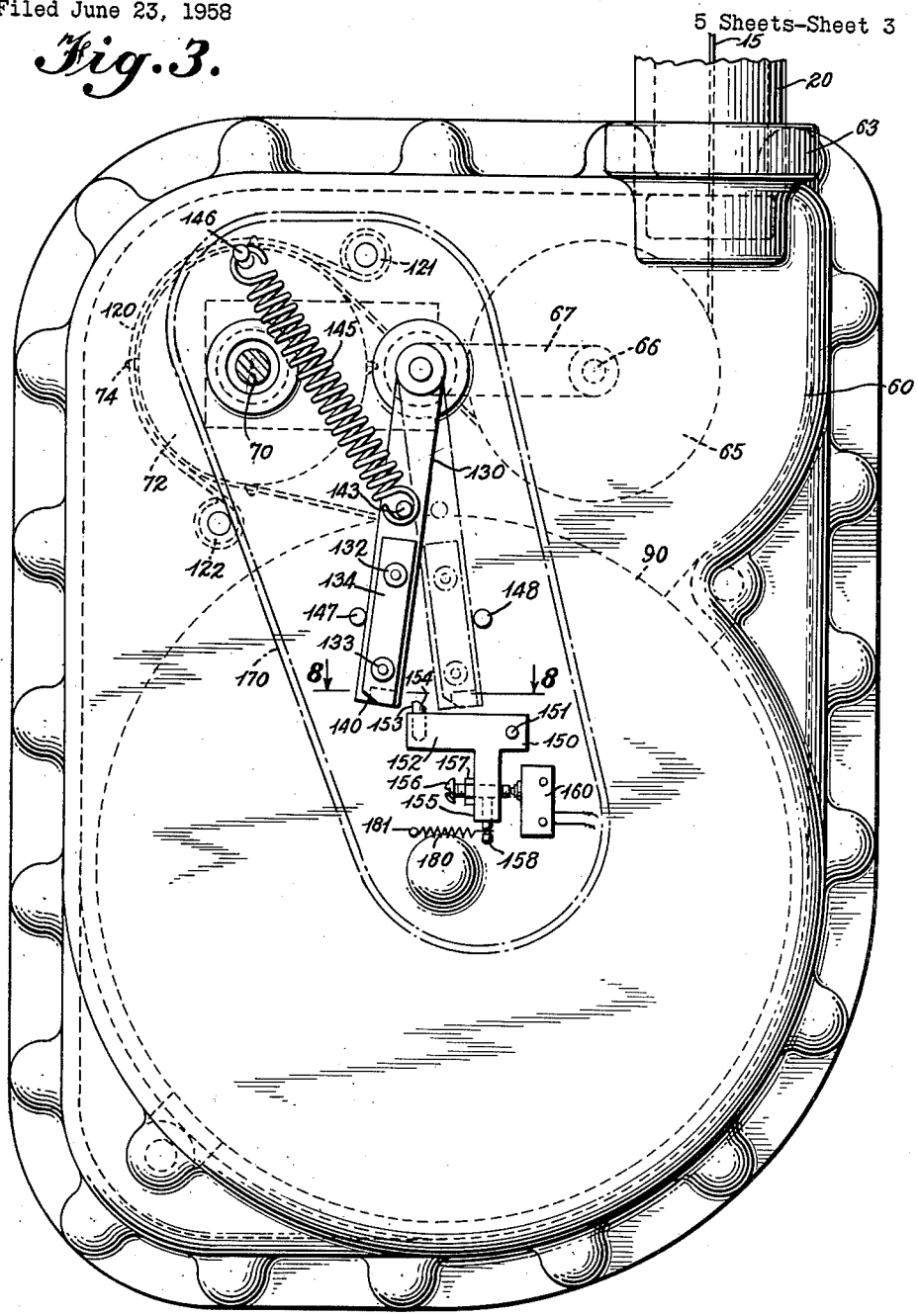
Figure 8:
Figure 6:
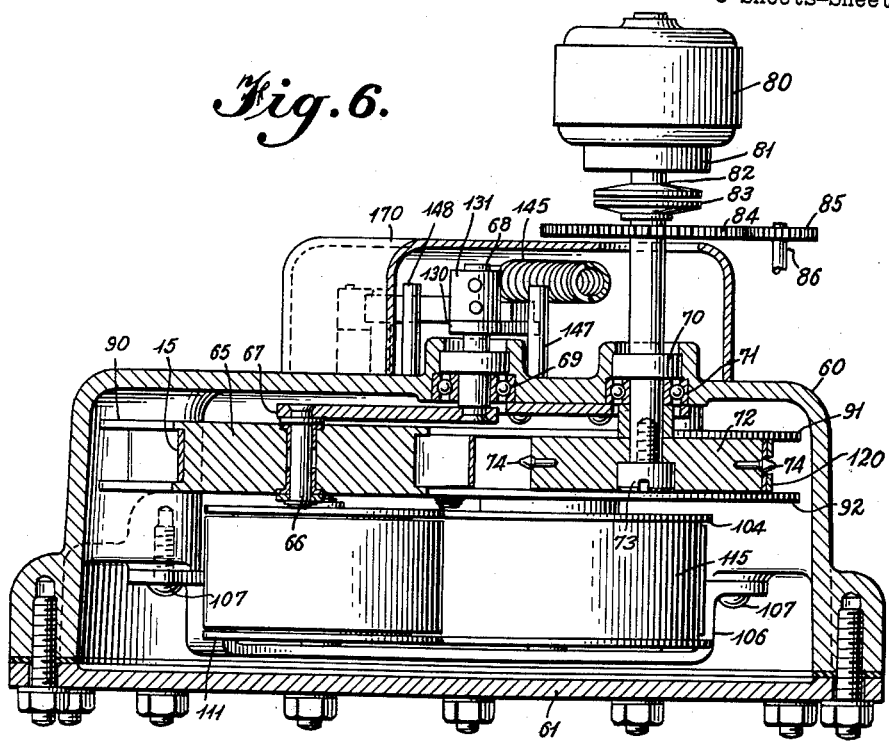
Figure 7:
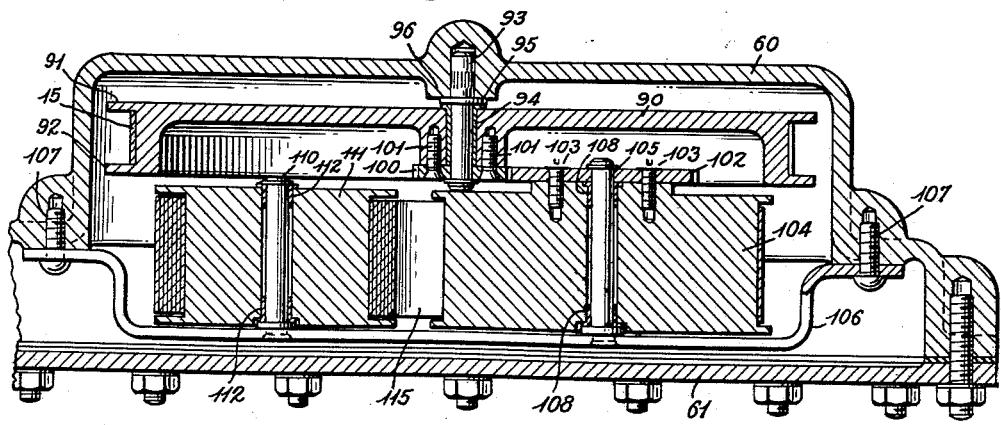

Other and further objects of the present invention will become more readily apparent from the following detailed description of a preferred embodiment of the present invention when taken in conjunction with the appended drawings in which:

FIGURE 1 portrays in diagrammatic fashion the apparatus of the present invention;
FIGURE 2 is a view in side elevation of the surface break detector with the cover plate removed;
FIGURE 3 is a view in side elevation looking at the back of the surface break detector with the back casing removed;
FIGURE 4 is a view in section taken along line 4—4 of FIGURE 2;
FIGURE 5 is a view in section taken along line 5—5 of FIGURE 2;
FIGURE 6 is a view in section taken along line 6—6 of FIGURE 2;
FIGURE 7 is a view in section taken along line 7—7 of FIGURE 2; and
FIGURE 8 is a view in section taken along line 8—8 of FIGURE 3.

Referring to the drawings in detail, a preferred embodiment of the present invention will now be described. As shown in FIGURE 1, a tank 10 is provided for containing a liquid indicated by the numeral 11. A hollow conical float 12, characterized by a concave bottom surface 13 rides at the surface of the liquid 11. An eyebolt 14 is fixed to the apex of the conical float 12 and one end of a tape 15 is attached to the eyebolt 14. A housing 16 is welded or otherwise attached to the top of the tank 10 and is of a size sufficient to accommodate the float 12. When the level of the liquid in the tank 10 rises toward the top, the float 12 can be received in the housing 16 and in this fashion is able to be operative in the upper areas of the tank 10. A tube 17 is shown bolted to the top of housing 16 in registry with an opening formed in the top. A second tube 18 is attached to the first at right angles by means of a suitable elbow fitting 19. A third tube 20 is attached at right angles to the tube 18 also by means of an elbow fitting 21. A pulley wheel 25 is conventionally mounted in the fitting 19 to be freely rotatable and a pulley wheel 26 is likewise conventionally mounted in the fitting 21, also freely rotatable. The tape 15 passes through the several tubes 17, 18 and 20 and over the pulleys 25 and 26.

The bottom of the tube 20 is connected with a surface break detector generally designated by the numeral 30. Electrical leads 31 and 32 connect the surface break detector with a control circuit generally designated by the numeral 40 and electrical leads 41 and 42 connect the control circuit with a readout device generally designated by the numeral 50. A motor 80 is operatively connected to drive the surface break detector 30 and readout device 50 by means of the mechanical connections 52, 53 and 54. Leads 56 and 57 represent output leads from the readout device 50 and serve as part of the means for transmitting the output of readout device 50 to a central station remote from the location of the tank 10 and other apparatus shown in FIGURE 1.

The surface break detector is illustrated in full detail in FIGURES 2-8 inclusive. The detector consists of an outer housing 60 and associated cover plate 61 attached to housing 60 by nuts and bolts in a conventional manner. A gasket seal 62 is provided to render the space defined within the housing 60 and plate 61 completely gas tight. The tube 20 is attached to a suitable fitting 63 cast as part of the top of the housing 60. In this region, the housing 60 defines an opening of substantially the same cross sectional area as that possessed by the tube 20.

Mounted within the housing 60 in general alignment with the fitting 63 is a pulley 65 freely rotatably supported on a shaft 66 by means of suitable bearings. The shaft 66 is cantilever supported at one end of a lever arm 67 which is fixed at its other end to a shaft 68. A ball bearing assembly 69 rotatably supports shaft 68 in an opening defined in the rear wall of the housing 60.

A second shaft 70 is supported in another opening defined in the rear wall of the housing 60 by means of ball bearing assembly 71 and a sprocket wheel 72 is fixed on the end of shaft 70 within the housing 60 by means of a screw 73. The axes of sprocket wheel 72 and pulley 65 are parallel and the two lie in the same plane. The sprocket wheel 72 is characterized by a plurality of sprockets 74 set into the peripheral surface of the sprocket wheel 72 substantially in the mid-circumferential plane normal to the axis of the wheel. The sprockets 74 are pin-like in nature having a shaft portion which is set radially into the wheel 72 and an enlarged conical head which projects radially from the surface.

The tape 15 extends into the housing 60 via the fitting 63 and passes around on the pulley wheel 65 and over the sprocket wheel 72. The tape 15 is provided with sprocket holes spaced at distances corresponding to the distance between successive sprockets 74 in the wheel 72.

The motor 80 is mounted to supply a driving force to the sprocket wheel 72. The output of the motor 80 is received by a suitable gear box of conventional design in order to step down the output r.p.m. to a more advantageous value. The gear box is generally designated by the numeral 81. The output shaft 82 of the gear box 81 is mechanically connected to drive the shaft 70 through the intermediary of a clutch assembly 83. A gear 84 is keyed to shaft 70 and meshes with a gear 85 fixed on shaft 86. This power takeoff serves to drive a readout device and correlate its movements with sprocket wheel 72.

Also mounted within the housing 60 is a large flanged take-up wheel 90. The tape 15 is received on the peripheral surface of the wheel 90 between the peripheral flanges 91 and 92. The wheel 90 is mounted on a shaft 93 cantilever supported by the housing 60. The shaft 93 is fixed in a boss 96 formed in the housing 60 and a bearing 94 is provided between the shaft and the wheel 90 in order that the latter may be freely rotatable with respect to the former. A spacer 95 is interposed between the wheel 90 and the boss 96. A spur gear 100 is mounted coaxial with the take-up wheel 90 by means of threaded elements 101 and meshes with a spur gear 102 mounted by means of threaded elements 103 on a wheel 104. The wheel 104 is mounted on a shaft 105 which in turn is cantilever supported from a bracket 106 which is attached to the casing 60 by means of threaded elements 107. The wheel 104 is supported on the shaft 105 by means of bearing elements 108 to be freely rotatable with respect to the shaft. A second shaft 110 is cantilever supported from the bracket 106 and carried thereon is a wheel 111 supported via bearing elements 112 whereby the wheel 111 is freely rotatable with respect to the shaft 110. A ribbon spring member 115 is coiled around the wheel 111 and has one end anchored to it and the other end of spring 115 is coiled about the wheel 104 and anchored to it. The arrangement described constitutes a spring assembly for biasing the take-up wheel 90 with a substantially constant tension. The design of the assemblage is preselected to exert a torque of substantially constant magnitude on the wheel 90 imparting a tendency to rotate in a direction to take up the tape 15. Accordingly, a substantially constant tension is maintained on the tape 15 at all times.

A shroud 120, consisting of a ribbon-like member, cooperates with the sprocket wheel 72. One end of the shroud 120 is anchored to a post 121 fixed to the rear wall of the housing 60 and the other end is anchored to a similar post 122, likewise fixed to the rear wall of the housing 60. The shroud extends around the periphery of the sprocket wheel 72 for approximately one-half its circumference and is characterized by a longitudinally extending slot 123 (see FIGURE 5) in the plane of the sprockets 74. By these means the shroud 120 is adapted to fit closely with the peripheral surface of the sprocket wheel 72 and thereby retain the tape 15 securely engaged and enmeshed with the sprockets 74.

The shaft 68 projects through the rear wall of the housing 60 and is supported by the bearing assembly 69 as previously described. One end of a lever arm 130 is attached to the shaft 68 and a collar 131 is also mounted on the shaft 68 serving to retain the lever 130 thereon. A pair of posts 132 and 133 are fixed to the face of the lever 130 remote from housing 60 and project normally therefrom. A plate 134 defines a pair of holes corresponding in position with the posts 132 and 133 and is received against the face of lever 130 and on the named posts. The holes defined by the plate 134 are slightly larger than the posts 132 and 133 whereby a loose fit exists. Washers 135 and 136 are affixed to posts 132 and 133, respectively, and a spring 137 is positioned around the post 133 bearing at one end against the lock washer 136 and at its other end against the plate 134. The spring 137 exerts a slight bias against the plate 134 urging it into contact with the lever 130. The bottom surface of the plate 134 is beveled as indicated by the numeral 140, and also the inner face of the plate 134, that is the face lying next to the lever 130, is beveled, as indicated by the numeral 141 (see FIGURE 8). A post 143 is fixed to the lever 130 above the plate 134 and a spring 145 engages the post 143 and a post 146 fixed to the rear wall of the housing 60. The spring 145 exerts a bias on the lever 130 pulling it to the left as viewed in FIGURE 3 against a stop 147. The lever 130, however, is adapted to pivot in a counterclockwise direction until it strikes a stop 148. The lever 130 is illustrated in this position in phantom in FIGURE 3.

A bell crank 150 is pivoted on a pin 151 mounted in the rear wall of the housing 60. One leg 152 of the bell crank extends in a substantially horizontal direction and a pin 153 is set into the upper surface of leg 152 and projects above the surface a slight distance. The pin is provided with a bevel as indicated by the numeral 154. The other leg 155 of the bell crank depends downwardly in a substantially vertical direction and defines a threaded horizontal bore into which is received a threaded element 156. A lock nut 157 is mounted on element 156. A post 158 is fixed to the bottom of leg 155 and a spring 180 engages the post 158 and a post 181 fixed to the rear wall of housing 60. The spring 180 holds bell crank 150 in the position shown in FIGURE 3 and thereby biases it against counterclockwise movement. A small portion of element 156 projects out from leg 155 and rests against the actuator element of a microswitch generally designated by the numeral 160. Whenever the bell crank 150 pivots in a counter-clockwise direction the threaded element 156 will strike against the actuator element of the microswitch 160 causing the switch to change condition. In the preferred embodiment the switch 160 is closed by this action. A casing 170 encloses the lever 130 and associated parts. In view of the above description, the bellcrank 150 with its associated parts and the microswitch 160 and its associated circuitry may properly be identified as being a part of the "indicating means" of this invention. The arrangement of plate 134 with its associated springs 137 and with its spring lifting bevel 141 provides a "by-pass means" to permit the sensing means to move in a counterclockwise direction (FIGURE 3) without tripping the indicating means and without interference therewith.

The operation of the apparatus will now be briefly described. Whenever it is desired to gauge the level of the liquid in the tank 10, an inquiry is transmitted from a central station to the remote location of the tank 10. The inquiry is received and manifests itself in the form of a means for closing the circuit to the motor 80. The input leads to the motor 80 are indicated by the numerals 43 and 44 and it is assumed for purposes of the invention that these input leads bring a source of suitable power to the motor 80. The inquiry from the central station may, for instance, cause power to be admitted to the motor circuit by causing a switch to be closed. When the motor commences to operate it will drive the sprocket wheel 72 to reel in the tape 15 which is taken up on the drum 90. As noted from FIGURE 1, operation of the sprocket wheel 72 occurs simultaneously with operation of the readout device due to the connections 52, 53 and 54. Hence, the readout device is correlated and indexed with the tape 15. The readout device may be comprised of one of a variety of devices. For example, the readout device may be comprised of a code tape having an associated scanning device. The position of the code tape relative to the scanning device would be correlated at all times with the tape 15. When suitably calibrated and actuated the code tape and scanning device would cooperate to produce electrical signals corresponding with indications of liquid level.

As the tape 15 is reeled in, the float 12 will tend to be elevated from the surface of the liquid 11. The concave bottom 13 of the float 12, however, causes a suction or surface tension effect which necessitates that more energy be expended than that required merely to lift the dead weight of the float 12 in order to free the float 12 from the surface of the liquid. So long as the float 12 is supported by the liquid, the lever 130 will be biased against stop 147 by the spring 145. In other words, the tension in the tape 15 is not sufficient to pivot the pulley wheel 65 in a counterclockwise direction as viewed in FIGURE 3 to cause the lever 130 to change its position. In fact, the tension imparted to the tape 15 by the dead weight of the float 12 is not sufficient to cause the pulley wheel 65 and lever arm 67 to pivot about the shaft 68 in the counterclockwise direction to move the lever 130 against the stop 148. It has been discovered, however, that the surface tension or suction effect produced by the concave bottom 13 requires a greater force to be exerted on the float 12 by the motor 80 through the sprocket wheel 72 and the tape 15 to free the float from the liquid 11 than is required to support the dead weight of the float 12. It is this greater force that is required to impart a sufficient tension to the tape 15 to cause the pulley wheel 65 and lever arm 67 to pivot about the shaft 68 against the resisting force of spring 145 to move the lever 130 from the position from which it is shown in solid lines in FIGURE 3 to the position shown in phantom in FIGURE 3 against the stop 148. During this counterclockwise movement of the lever 130 as viewed in FIGURE 3, the bottom edge of the plate 134 comes into contact with the projecting portion of pin 153. Due to the inclined surface 141, however, the plate 134 is cammed or rocked out away from lever 130 permitting the pin 153 to pass in between the plates 130 and 134. The action of the lever 130 in pivoting counterclockwise is tantamount to cocking the microswitch actuating mechanism.

When the float 12 is finally pulled free of the liquid 11, the tension on the tape 15 will be reduced since at this time only the dead weight of the float 12 is supported. Since the spring 145 is sufficiently strong to maintain the lever 130 against the stop 147, even when the dead weight of float 12 is being supported, the lever 130 will now pivot in a clockwise direction as viewed in FIGURE 3 from stop 148 to 147. During this movement the beveled surface 140 at the bottom of the plate 134 will engage the beveled surface 154 on the pin 153 forcing the pin 153 downward. This causes the bell crank 150 to pivot in a counterclockwise direction (see FIGURE 3) and the threaded element 156 actuates the microswitch 160. This produces an electrical pulse which closes a control circuit for the readout device and actuates the scanner which commences scanning the code tape and transmittting the scanned information via output leads 56 and 57 back to the central station. Since the code tape is correlated with the tape 15 by the means described, the apparatus will substantially instantaneously commence the transmission of liquid level information precisely coincident with the float 12 breaking with the surface of the liquid 11. By the apparatus described, an electrical pulse is generated at the instant of break between the float 12 and the surface of the liquid 11 which pulse actuates a control circuit and readout device to transform liquid level information into electrical energy and transmit this electrical energy to a central station.

Although the present invention has been shown and described with reference to a preferred embodiment, it will be appreciated that various changes and modifications are possible without departing from the spirit of the invention. Such changes and modifications as are obvious to those skilled in the art from a knowledge of this invention are deemed to be within the contemplation of the invention.

What is claimed is:

1. Apparatus for use in gauging liquid confined in a container comprising a member adapted to be withdrawn from the liquid, said member having a design to require a greater force to withdraw it from the liquid than required to support its dead weight, a pulley mounted for movement between a first position and a second position, bias means to urge said pulley to said first position, a flexible element connected to said member and engaging said pulley in opposition to said bias means, and take-up means for said flexible element said flexible element being reeved about said pulley in such a manner that the tension created in said flexible element when said greater force is applied is sufficient to move said pulley to said second position, and indicating means actuated by the return movement of said sensing means to its first position to indicate when the member separates from the surface of the liquid.

2. Apparatus for use in gauging liquid confined in a container comprising a float having a design to require a greater force to withdraw it from the liquid than required to support its dead weight, sensing means mounted for movement between a first position and a second position, bias means to urge said sensing means to said first position, a flexible element connected to said float and engaging said sensing means in opposition to said bias means, and take-up means for said flexible element said sensing means being adapted to be moved from its first position to its second position by the tension created in said flexible element in opposition to said bias when said greater force is applied and adapted to be returned by said bias when said tension is relieved, and indicating means actuated by said sensing means and operative only when the sensing means moves from the second to the first position.

3. Apparatus for use in gauging liquid confined in a container comprising a unitary float having a design to require a greater force to withdraw it from the liquid than required to support its dead weight, sensing means mounted for movement between a first position and a second position, said sensing means moving to said second position during withdrawal of said float and back to said first position upon complete withdrawal of said float, bias means to urge said sensing means to said first position, a normally tensed flexible element connected at one end directly to said unitary float and engaging said sensing means in opposition to said bias means and take-up means for said flexible element saidsensing means being moved to said second position by the application of additional tension into said flexible element by said greater force.

4. Apparatus as recited in claim 3 further comprising indicating means actuated in response to movement of said sensing means.

5. Apparatus as recited in claim 3 further comprising indicating means actuated in response to movement of said sensing means from its second position to its first position.

6. Apparatus for use in gauging liquid confined in a container comprising a member having a design to require a greater force to withdraw it from the liquid than required to support its dead weight, sensing means mounted for movement between a first position and a second position, bias means to urge said sensing means to said first position, a normally tensed flexible element connected to said member in such a manner as to be placed in greater tension during the existence of said greater force and engaging and applying a force to said sensing means in opposition to said bias means, take-up means for said flexible element, said sensing means adapted to overcome said bias means and move to said second position during withdrawal of said member from the liquid and to be instantly restored to said first position by said bias means responsive to complete withdrawal of said member, and indicating means actuated in response to movement of said sensing means being restored to said first position.

7. Apparatus for use in gauging liquid confined in a container comprising a member having a design to require a greater force to withdraw it from the liquid than required to support its dead weight, sensing means mounted for pivotal movement between a first position and a second position, bias means to urge said sensing means to said first position, a normally tensed flexible element connected to said member in such a manner as to be placed in increased tension during the existence of said greater force and engaging and applying a torque to said sensing means in opposition to said bias means, take-up means for said flexible element, said sensing means adapted to pivot against said bias means to said second position during withdrawal of said member from the liquid and to be instantly restored to said first position by said bias means responsive to complete withdrawal of said member, and indicating means on said apparatus adapted to be actuated by the restoring movement of said sensing means to said first position, and bypass means in said sensing means to permit said sensing means to move to said second position without interference with said indicating means.

8. Apparatus for use in gauging liquid confined in a container comprising a member having a design to require a greater force to withdraw it from the liquid than required to support its dead weight, sensing means mounted for pivotal movement between a first position and a second position, bias means to urge said sensing means to said first position, a normally tensed flexible element connected to said member in such a manner as to be placed in greater tension during the existence of said greater force and engaging and applying a torque to said sensing means in opposition to said bias means, take-up means for said flexible element, said sensing means adapted to pivot against said bias means to said second position during withdrawal of said member and to be instantly restored to said first position by said bias means responsive to complete withdrawal of said member, and indicating means actuated in response to movement of said sensing means when said sensing means is being restored to said first position.

9. Apparatus for use in gauging liquid confined in a container comprising a member having a design to require a greater force to withdraw it from the liquid than required to support its dead weight, a pivotally mounted pulley, a lever mounted to pivot with said pulley, bias means to urge said pulley to a first position, a normally tensed flexible tape connected to said member in such a manner as to be placed in greater tension during the existence of said greater force and engaging and applying a torque to said pulley in opposition to said bias means, take-up means for said flexible tape, said pulley being adapted to pivot against said bias means to a second position during withdrawal of said member and to be instantly restored to said first position by said bias means responsive to complete withdrawal of said member, and indicating means actuated by said lever in response to said pulley's being restored to said first position.

10. Apparatus for use in gauging liquid confined in a container comprising a float having a design to require a greater force to withdraw it from the liquid than required to support its dead weight, a pulley mounted for pivotal movement, a lever connected to pivot with said pulley, bias means to urge said pulley to a first position, a flexible tape connected to said float in such a manner as to be placed in greater tension during the existence of said greater force and engaging and applying a torque to said pulley in opposition to said bias means, take-up means for said flexible tape, said pulley adapted to pivot against said bias means to a second position during withdrawal of said float and to be restored to said first position by said bias means coincident with complete withdrawal of said float, and indicating means actuated by said lever during restoration of said pulley to said first position.

11. Apparatus for use in gauging liquid confined in a container comprising in combination, a float having a design to require a greater force to withdraw it from the surface of the liquid than is required to support its dead weight, sensing means including a pulley mounted for shiftable movement between a first and a second position, a normally tensed flexible element connected at one end directly to said float and engaging said shiftable pulley of said sensing means, bias means to urge said shiftable pulley to said first position, take-up means connected to the opposite end of said flexible element, said flexible member being under greater tension during the existence of said greater force, the greater tension in said flexible member causing said pulley to shift to said second position during withdrawal movement of said float from the liquid and to be instantly restored to said first position by said bias means in response to and coincident with complete withdrawal of the float from the surface of the liquid, and indicating means actuated in response to the shiftable movement of said pulley when restored to said first position by said bias means.

12. The apparatus as defined in claim 11 wherein a lever is connected to said shiftable pulley to shift therewith, said lever actuating said indicating means in response to the movement of said pulley when restored to said first position by said bias means.

13. The apparatus as defined in claim 12 wherein said flexible element comprises a flat tape member.

References Cited in the file of this patent

UNITED STATES PATENTS

| | | |
|---|---|---|
| 2,282,774 | Wiggins | May 12, 1942 |
| 2,627,660 | Smith | Feb. 10, 1953 |

FOREIGN PATENTS

| | | |
|---|---|---|
| 1,088,196 | France | Sept. 8, 1954 |